United States Patent [19]

Lott

[11] 4,024,002
[45] May 17, 1977

[54] METHOD AND PRODUCT FOR COVERING AIRCRAFT

[75] Inventor: William Gray Lott, Bakersfield, Calif.

[73] Assignee: Eonair, Inc., Bakersfield, Calif.

[22] Filed: June 7, 1976

[21] Appl. No.: 693,305

[52] U.S. Cl. .................................. 156/85; 428/245; 428/272; 428/483; 428/913
[51] Int. Cl.² .......................................... B32B 31/00
[58] Field of Search .......... 428/229, 245, 255, 272, 428/290, 338, 339, 483, 913; 156/85, 213, 214, 217, 86, 225; 264/DIG. 71, 342, 338

[56] References Cited
UNITED STATES PATENTS 3,330,710   7/1967   Lloyd et al. ........................ 156/85

FOREIGN PATENTS OR APPLICATIONS 118,981   9/1944   Australia ............................ 156/85
657,427   2/1963   Canada .............................. 156/86

Primary Examiner—James J. Bell
Attorney, Agent, or Firm—Ralph B. Pastoriza

[57] ABSTRACT

A heat shrinkable fabric is impregnated with a plastic or resin material to reduce its air permeability prior to any assembly of the fabric on an aircraft. After the fabric has been pre-impregnated it is then available for sale as an aircraft covering. A purchaser need only cover the aircraft and heat shrink the same, applying thereafter filler and/or paint coatings as desired.

3 Claims, 4 Drawing Figures

METHOD AND PRODUCT FOR COVERING AIRCRAFT

This invention relates generally to aircraft and more particularly to an improved method and product for covering complete aircraft or frame portions thereof.

BACKGROUND OF THE INVENTION

It is presently known to cover aircraft with a synthetic material characterized in that it will shrink under the application of heat. Such a material is commercially available, one example being polyester cloth. An aircraft maintenance man can purchase the material in large quantities, assemble it over a frame portion of an aircraft by sewing or gluing sections together and attaching the same to the aircraft and thereafter heat shrinking the material so it will cling tightly to the aircraft frame portions. The heat shrinking may take place in a large oven or may be progressively applied as by heated irons or the like. The applied heat may range from 212° to 425° F.

After heat shrinking the material onto the aircraft, it is covered with a primer such as a phenoxy resin, coated with a filler, permitted to dry, and again coated with the filler which may also constitute a phenoxy type resin, and finally painted, for example, with a finish coating of enamel.

It has been found that when the foregoing method is employed, portions of the fabric material particularly when disposed against solid frame surfaces tend to develop pin holes. It is believed that these pin holes result from the capillary action of the solid surface area drawing away some of the coating material. In addition, any faults in the fabric weaving can result in the development of small openings or pin holes.

Development of pin holes as described above can result in poor appearance of the fabric in such areas. It is therefore important in covering aircraft in accord with present known methods to apply the successive coatings to the material after it has been shrunk onto the frame portion with meticulous care and at least two and preferably more coatings with suitable dope or resin are required.

BRIEF DESCRIPTION OF THE PRESENT INVENTION

In accord with the present invention, a heat shrinkable fabric such as polyester cloth is impregnated to reduce its air permeability prior to any application of the fabric to an aircraft or frame portion. Preferably, the heat shrinkable fabric is impregnated with an appropriate coating having the necessary adhesive, flexibility and recoatability characteristics, for example, a water base acrylic emulsion, by passing the material from a roll through a suitable dip tank or by an equivalent impregnating operation.

After drying and/or curing, the fabric material may then be supplied to aircraft maintenance men with the precoating or impregnation constituting a part of the material. The fabric may then be suitably cut, sewn together, glued or mechanically attached to various portions of the aircraft and the heat shrinking step then carried out. A filler may then be applied after the heat shrinking and thereafter only a suitable paint need be applied. However, it is possible to paint the shrunk material directly without a filler.

With the foregoing method and product, the major problem of pin holes resulting from capillary action or even inconsistencies in the weave, is virtually eliminated. Moreover, a substantially smoother finish results and plural coating steps with phenoxy type resins or dopes after the heat shrinking operation can be eliminated.

BRIEF DESCRIPTION OF THE DRAWINGS

A better understanding of the method and product of this invention will be had by referring to the accompanying illustrative drawings in which.

DETAILED DESCRIPTION OF THE INVENTION

Figure 1:
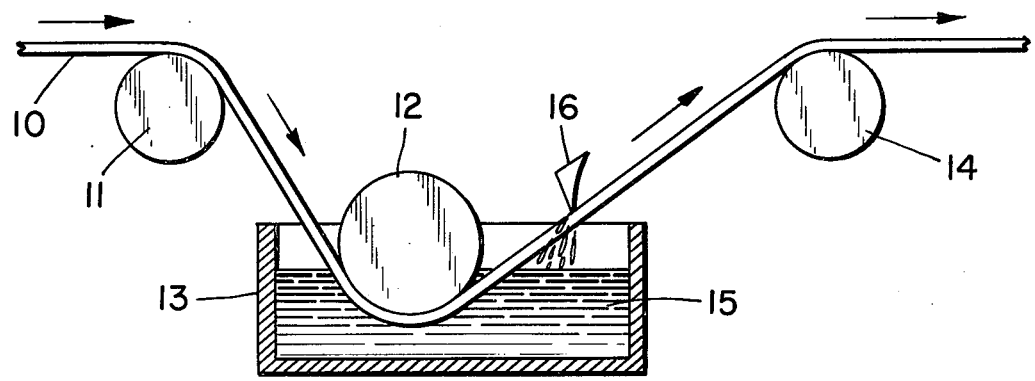
FIG. 1 shows one means for impregnating a heat shrinkable fabric.

Referring first to FIG. 1 there is shown a fabric material 10 which may constitute a synthetic polyester yarn woven into a sheet of cloth. Such material is available on the commercial market, one example being Dacron.

In accord with this invention, the material is impregnated as by continuously passing the same over a guide roller 11 and under a dip tank roller 12 partially immersed in a dip tank 13. The material passes up over another guide roller 14. The dip tank 13 is filled with a suitable coating material 15. The material 15 may constitute, by way of example, a water base acrylic latex substance which thoroughly impregnates the interstices of the woven yarn. A scraper knife or equivalent tool 16 is illustrated for removing excess coating material as the fabric leaves the dip tank.

Figure 2:
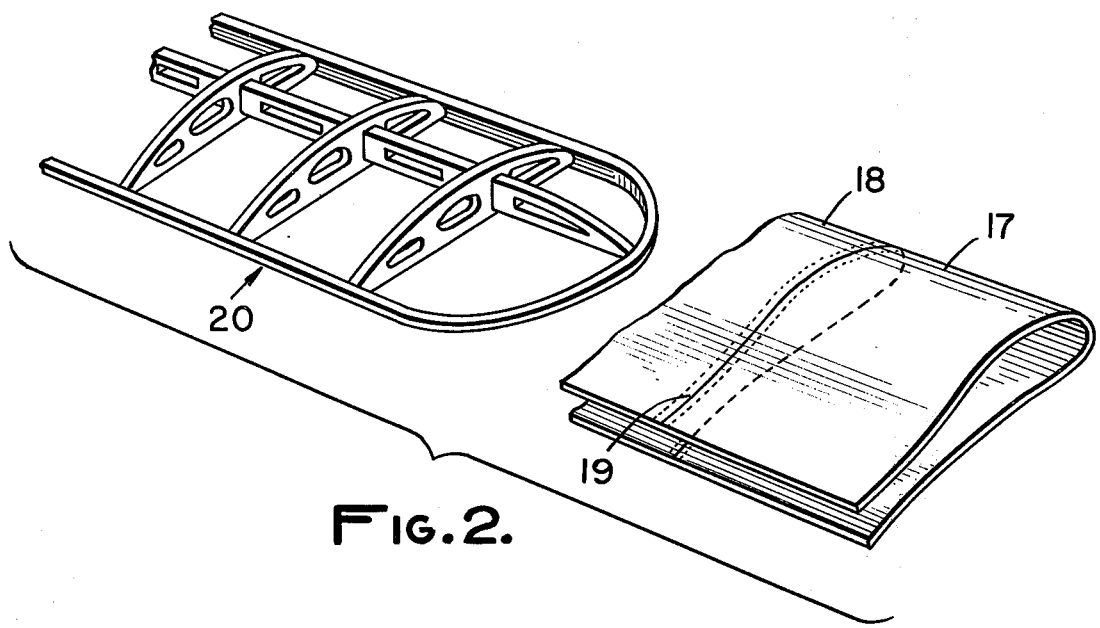
FIG. 2 illustrates in perspective view sections of fabric fixed together preparatory to being attached to a portion of an aircraft.

After the fabric material has been impregnated and allowed to dry and/or cure, it may be stocked and sold to aircraft maintenance men for the purpose of covering aircraft. Thus, referring to FIG. 2, sections of the material such as 17 and 18 may be sewn or otherwise fastened together as at 19 and secured as by gluing or mechanical attachment about portions of an aircraft frame 20.

Figure 3:
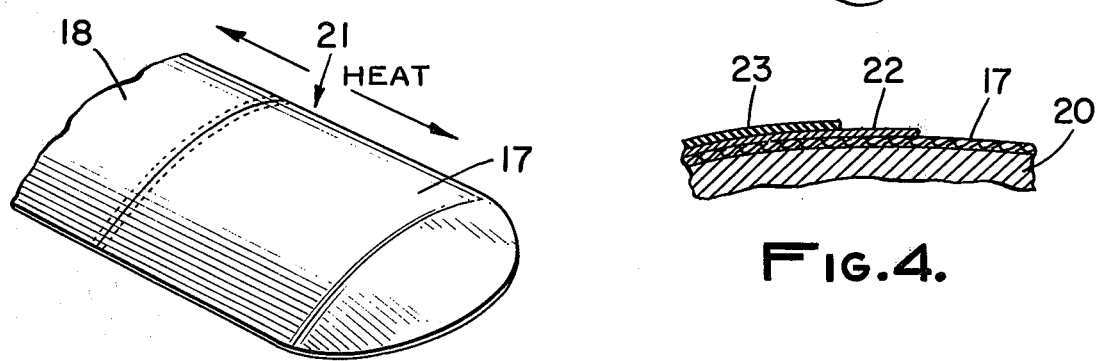
FIG. 3 illustrates the portion of the aircraft in FIG. 2 fully covered with the fabric.

Only after the material has been secured about the frame as illustrated in FIG. 3 is a heat shrinking process carried out. This heat shrinking can be effected in an oven or may be progressively effected by means of heated irons or the like as indicated by the arrows 21. The heat applied may be from 212° to 425° F and functions to shrink the fabric tightly about the frame structure.

After the heat shrinking operation and the installation of the usual tapes and attachments, the fabric is preferably coated with a filler such as a phenoxy resin and because of the pre-impregnation of the fabric, one filler coating, if used, is adequate. Finally, the fabric may be painted. As mentioned heretofore, the application of a filler coating is not essential.

Figure 4:
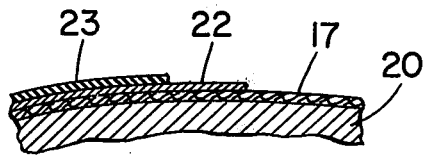
FIG. 4 is a fragmentary broken away cross-section of a portion of the aircraft frame after it has been covered with the fabric material and associated coatings, the material and coatings being shown in greatly exaggerated thickness dimensions for ease of illustration.

FIG. 4 illustrates the basic coatings after the heat shrinking operation. Thus, there is illustrated a portion of the aircraft frame 20 with the pre-impregnated fabric 17 covering the same. The filler coating is illustrated at 22 followed by a paint coating 23.

It has been found as a consequence of the pre-impregnating step to provide a pre-impregnated fabric as described, that many of the problems heretofore associated with covering the aircraft with heat shrinkable fabric are avoided. First, because of the pre-impregnation, the fabric is conditioned so that after heat shrinking, it can easily hold filler material and/or paint, there being little chance for capillary type action by smooth undersurfaces which might prevent the filler and/or paint from further impregnating the fabric. Thus, the problem of pin holes or openings resulting from small faults in the weave are avoided. Moreover, because of the pre-impregnation, only a single additional coating of filler and/or paint is necessary after the heat shrinking step. This latter feature makes the complete covering of an aircraft far simpler with a substantial savings in labor, costs and time.

The pre-impregnating operation improves the adhesion of the impregnating material to the fabric as compared to the old method of applying the material to the cloth after it has been attached to the airplane. This improvement is a result of the cloth being thoroughly saturated in the dip tank or other coating machine.

Further advantages of pre-impregnation, particularly when a water base latex is used, are the savings in energy, man power, cost and reduced atmospheric pollution which otherwise occurs when petroleum based solvents are used as in the prior art. In addition, the pre-impregnated fabric can be more easily marked by pencil or pen when tracing from a pattern and can also be easily cut without bothersome fringing of the cut edges.

From all of the foregoing, it will thus be evident that the present invention has provided a valuable contribution in the art of covering aircraft.

What is claimed is:
1. A method of covering aircraft including the successive steps of:
   a. providing a heat shrinkable fabric;
   b. impregnating said fabric to reduce its air permeability;
   c. securing sections of the impregnated fabric to a frame portion of the aircraft; and,
   d. heating said impregnated fabric while on said frame portion to shrink the same.
2. The method of claim 1, in which said fabric comprises a synthetic polyester yarn woven into a sheet of cloth and in which the impregnating material comprises a water base acrylic latex resin, impregnation being carried out by continuously passing said sheet from a roll through a dip tank containing said resin.
3. The method of claim 1, including the additional steps of drying and/or curing said heat shrinkable fabric after the same has been impregnated, coating said impregnated fabric with a filler material after heating of the fabric to shrink the same, and painting the filler coated fabric.

* * * * *